United States Patent [19]

Kleman

[11] 4,407,234

[45] Oct. 4, 1983

[54] PORTABLE AND ADJUSTABLE APPARATUS FOR CLEANING, GROOMING, AND OTHERWISE TREATING DOGS AND OTHER ANIMALS OF SIMILAR SIZE

[76] Inventor: Joseph F. Kleman, 38 Main St., Locust Gap, Pa. 17840

[21] Appl. No.: 283,085

[22] Filed: Jul. 13, 1981

[51] Int. Cl.³ .............................................. A01K 13/00
[52] U.S. Cl. ................................................... 119/158
[58] Field of Search ................... 119/1, 158, 159, 160

[56] References Cited

U.S. PATENT DOCUMENTS

| | | | |
|---|---|---|---|
| 1,879,915 | 9/1932 | Smoot | 119/159 X |
| 3,749,064 | 7/1973 | Weinstein et al. | 119/158 |
| 3,884,191 | 5/1975 | Stout | 119/158 |
| 4,029,048 | 6/1977 | Gershbein | 119/1 |
| 4,057,032 | 11/1977 | Dimitriadis | 119/158 X |

FOREIGN PATENT DOCUMENTS 2396504  3/1979  France .................................. 119/158

Primary Examiner—Robert P. Swiatek
Attorney, Agent, or Firm—Edwin E. Greigg

[57] ABSTRACT

A durable and relatively inexpensive readily portable and easily adjusted apparatus for cleaning, grooming, and otherwise treating dogs and other animals of similar size, comprises a combination of simple and inexpensive elements which may be readily and easily utilized; and the operation of which is such as to eliminate or very materially reduce excitement or traumatization of the animal; while at the same time requiring but a minimum of effort and inconvenience on the part of the operator and without any leakage of water onto the surrounding environment or the attire of the operator.

1 Claim, 4 Drawing Figures

PORTABLE AND ADJUSTABLE APPARATUS FOR CLEANING, GROOMING, AND OTHERWISE TREATING DOGS AND OTHER ANIMALS OF SIMILAR SIZE

The present invention relates to apparatus for cleaning, grooming or otherwise treating dogs and other animals of similar size, and especially to the washing of such animals.

It is, of course, very well known that various problems are usually encountered in the washing of dogs, and particularly those of excitable disposition and/or large size which may make them more difficult to physically handle.

Generally, such animals are washed in open tubs which results in such disadvantages as water and soap being inadvertently splashed over a large surrounding area and the wetting of the person who is conducting the washing operation. Also, such animals have a natural tendency to try to run or jump from the area in which they are temporarily positioned. Consequently, the animal must be restrained to some extent, the manner of which it might find uncomfortable, frightening, or even injurious.

It is among the objects of the invention to provide a self-contained apparatus for cleaning, grooming and otherwise treating dogs and other animals of similar size, and particularly the washing thereof, which may be used by the operator with but a minimum of effort and inconvenience and without impairing the attire of the operator and surrounding areas, and wherein the operation is simple and safe and such as to eliminate or very materially reduce discomforture, excitement or traumatization of the animal.

Another object is the provision of an apparatus which possesses the desirable characteristics set forth immediately hereinbefore, and which comprises a durable combination of simple and inexpensive elements or components which may be easily and rapidly utilized.

The foregoing and other objects and advantages will become more apparent after referring to the description set forth hereinafter and the accompanying drawings wherein like reference characters refer to like parts, and wherein.

Referring more particularly to the drawings, the apparatus of the invention comprises a rectangular main housing generally indicated at 1 and a non-removable top or cover generally indicated at 2.

The rectangular main housing is principally formed by a pair of spaced and parallel rectangularly-shaped side walls 5 and 7 which are connected at their side edges to right-angularly extending, removable end panels 9 and 11 through the medium of vertically extending guide members 13 to which the ends of the removable side walls 5 and 7 are immovably secured.

Figure 1:
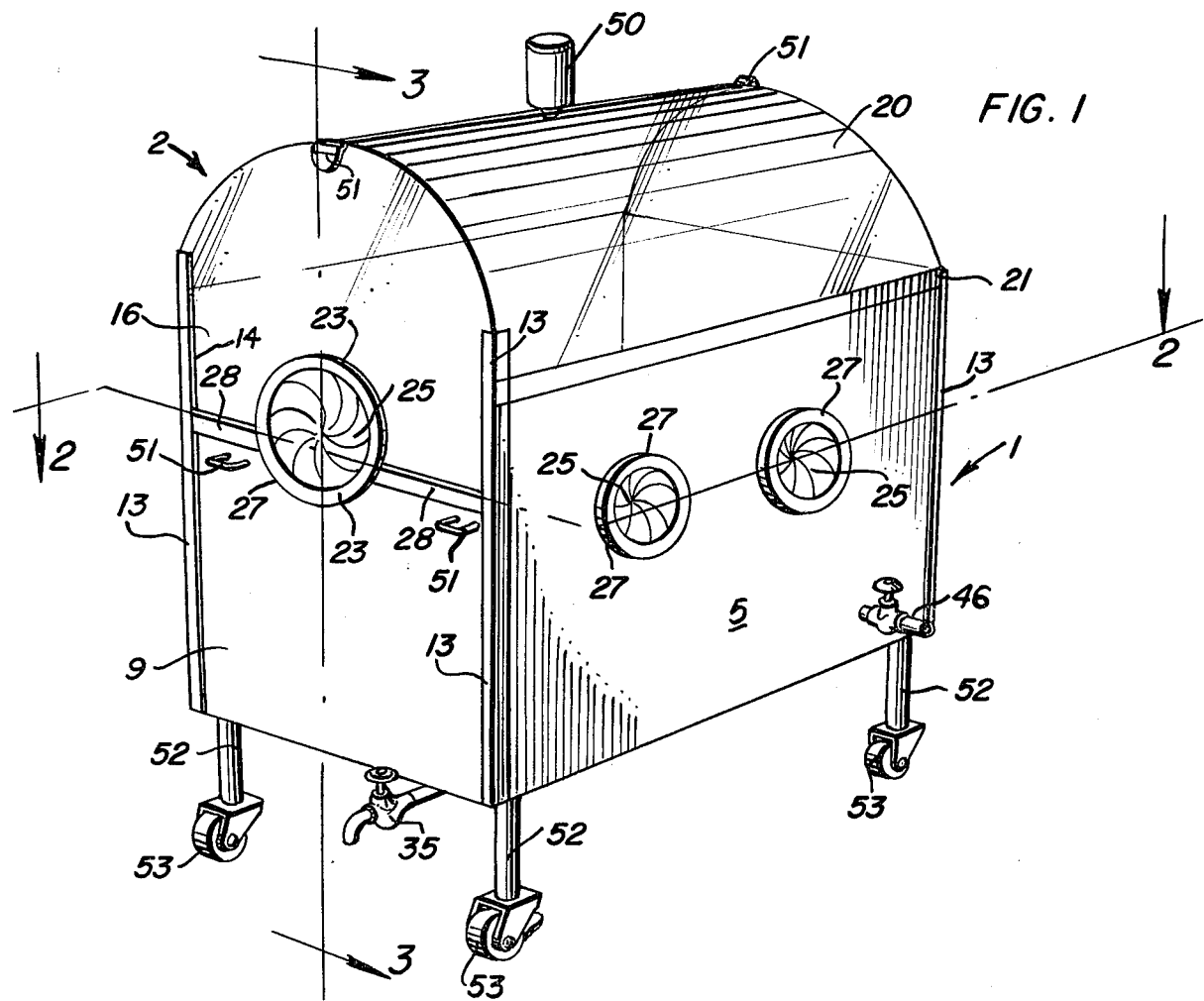
FIG. 1 is a perspective view of an apparatus which is constructed in accordance with the teachings of the invention and which comprises a generally rectangular main housing that contains or supports the other elements or components, together with a non-removable top or dome.

Referring to FIG. 1, the front end panel 9 is substantially rectangular and extends vertically to the approximate horizontal center-line of the apparatus where it is contacted by the lower end of an upper end panel 16.

Figure 3:
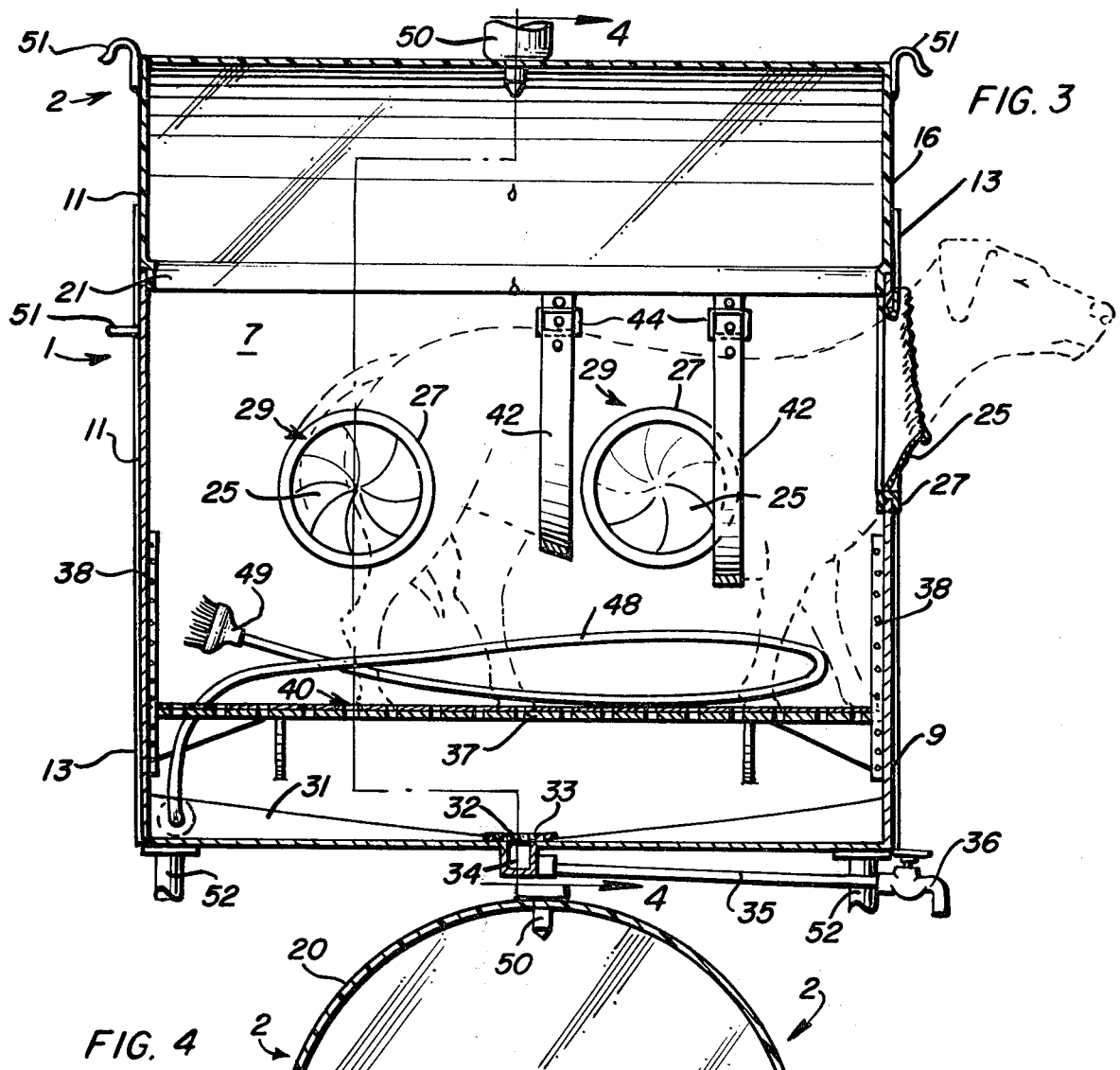
FIG. 3 is a side elevational view, partly in section, of the apparatus of FIGS. 1 and 2 with the dog shown as disposed therein.
Figure 4:
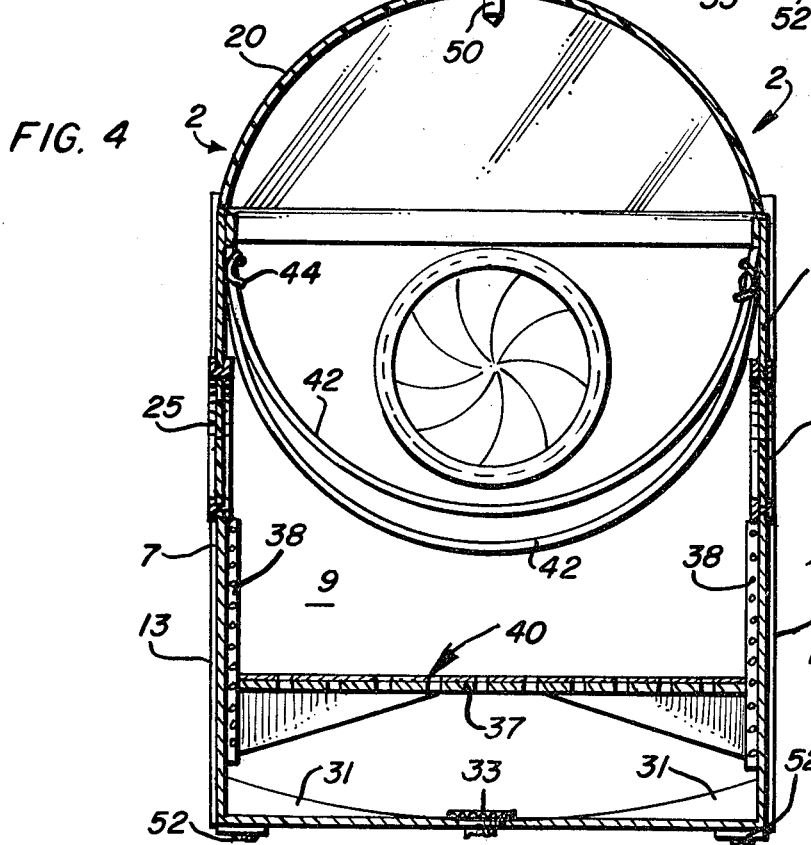
FIG. 4 is a sectional view which is taken along the line 4—4 of FIG. 3.

As shown most clearly in FIG. 3, the rear end panel 11 is one-piece.

The lower and upper front end panels 9 and 16 respectively, and the one-piece rear end panel 11 are all slidably disposed in the vertically extending guide members 13 at the corners of the generally rectangular housing 1.

Referring still to FIG. 1, the upper edges of the front end panel 16 are arcuately curved with the lower extremities thereof terminating proximate the upper ends of those side edges of said panel which are slidably disposed in the channels 14 of the guide members 13.

The major surface of the top or cover 2 is shown as comprising a single arcuately-shaped sheet 20 of transparent material, such as Plexiglass, which is rectangular in plan and if desired, the upper ends of the vertical side edges of the one-piece rear end panel 11 and the upper front end panel 16 may be foreshortened and the adjacent portions of the arcuately-shaped transparent sheet 20 be straightened so as to permit the same to slide downwardly into separate channel-ways associated with the guide vertical members 13.

In any event, the side edges or extremities of the arcuately-shaped transparent sheet 20 are straight and when the top or cover is in assembled condition contact horizontally disposed waterproofing strips 21 which are disposed along the upper edges of the side walls 5 and 7 of the housing.

The upper horizontal edge of the lower front end panel 9 and the lower horizontal edge of the upper front end panel 16 are provided with opposed and matching semi-circular recesses to form, between them, a circular aperture 23 within which there is disposed an iris-shaped closure 25 of flexible waterproof material, such as vinyl. This iris-shaped closure 25 provides a central opening which may be expanded or contracted by means of a circular adjusting ring 27. Such an adjustable closure is well-known in the art, and in the present instance is carried on the upper edge of the lower front end panel 9.

A waterproofing strip 28 carried by either the lower front end panel or the upper front end panel seals the remainder of their adjoining edges.

As shown in FIG. 3, the foregoing arrangement permits the head of a dog to protrude through the iris of the flexible waterproof material 25, and thus postpone, until after the remainder of the dog has been washed, any problems which might be caused by soap suds in its eyes and water in its ears.

Similarly, a pair of substantially spaced circular apertures with iris-shaped closure 25 of flexible waterproof material and circular adjusting ring 27 is provided in each of the side walls 5 and 7 of the main housing 1, the same being for the purpose of receiving the hands and forearms of the operator of the apparatus.

Referring more particularly to FIG. 3, the lowermost portion of the rectangular main housing 1 is provided with a concave bottom member or floor 31 having a drain opening 32 with screen 33 and lower drain recess 34, the latter being connected to a horizontally slanting drain pipe 35 having a valved outlet 36 at its outer end.

Disposed above the concave bottom member or floor 31 is a horizontal platform 37 which is provided with a suitable means for enabling its easy and rapid vertical adjustment; for example, the very well-known peg-and-hole arrangement generally indicated at 38.

In addition, the upper surface of the horizontal platform 37 is provided with a non-skid or slip-reducing coating indicated at 40.

Secured to one side of the rectangular main housing 1 is one end of an adjustable supporting and restraining sling in the form of spaced parallel flexible straps 42 which are adapted to extend beneath and in contact with the underside of the body of a dog standing on the horizontally extending vertically adjustable perforate platform 37, and be fastened to suitably positioned buckles 44 on the opposite side of the main housing 1.

Figure 2:
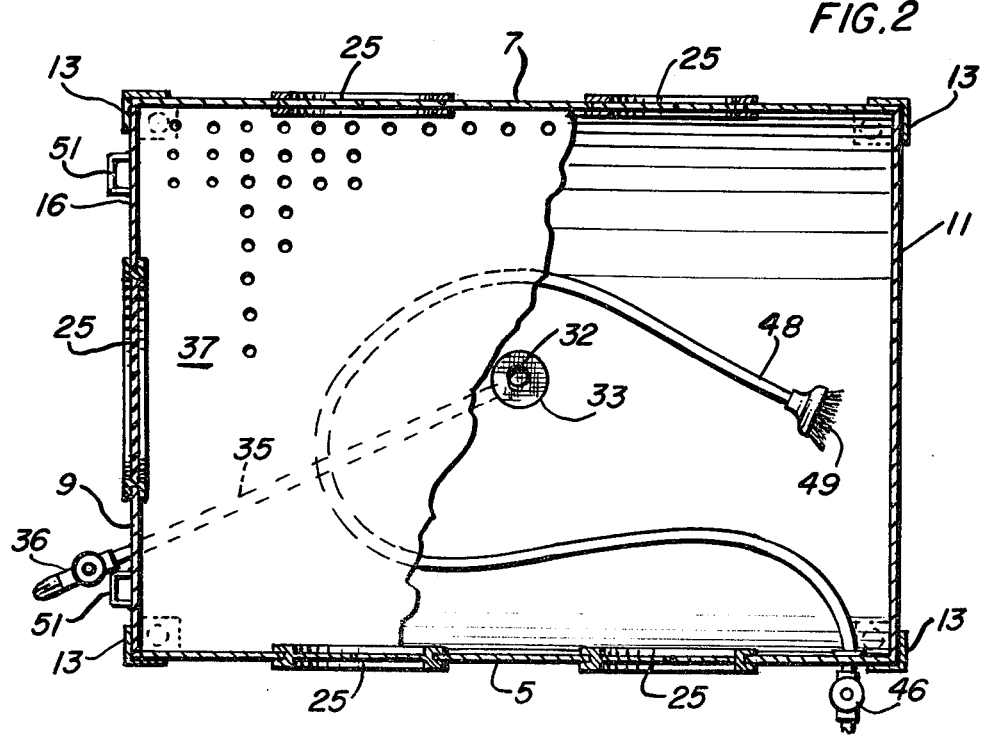
FIG. 2 is a plan view, partly in section, of the apparatus of FIG. 1.

As shown most clearly in FIGS. 2 and 3, a valved water supply connection 46 is attached to the outer surface of the side wall 5 adjacent the lower and rear edges thereof, and communicates through said side wall with a flexible hose 48 within the main housing. The inner end of the flexible hose 48 is provided with a suitable spray head 49.

Through the aforementioned instrumentalities, water from a suitable outside source may be supplied for the washing operation; and soap or other coat-treating material or medicament may be supplied through a dispensing container 50 which is shown as being mounted on the top or dome 2 and communicating with the interior thereof.

Conveniently disposed lifting handles 51 are provided for the vertically movable front panels 9 and 16 and back panel 11.

In the further interests of convenience and easier manipulation, the main housing 1 is mounted upon vertically extending legs 52 that are provided at their lower ends with caster-mounted rollers or wheels 53.

All of the materials of the main housing 1, the top or cover 2, and the instrumentalities employed with each of them, may be selected from those which are best suited for their intended purposes; and, of course, include various types of woods, plastics and light metals such as aluminum, with waterproofing at various jointures, etc.

In the preferred manner of operation of the apparatus of the invention, the front upper and lower end panels 16 and 9, respectively, are vertically removed; followed by the vertical removal of the rear end panel 11. Then the vertically adjustable horizontal perforate platform 37 is checked for height and adjusted if necessary or desirable. At this point the dog is free to move onto the perforate platform 37. The front panels in place, the dog's head is gently guided into and through the iris-shaped closure 25 with circular adjusting ring 27. Shortly before or shortly after the placing of the dog's head in the manner described, the supporting and restraining sling comprising the flexible straps 42 is adjusted with respect to the underside of the dog.

With the supply of water through the valved water supply connection 46 and the supply of soap from the dispensing container 50, the entirety of the dog, except for its head which is disposed outside the apparatus, may be very thoroughly washed by the use of the hands of the operator which extend though the iris-shaped closures 25 in the side walls 5 and 7 of the main housing. The head, of course, is washed independently.

After the complete washing operation, the end panels are vertically removed, and the dog may be thoroughly dried while still in place on the vertically adjustable perforate plateform 37. The dog is then gently walked forwardly or backwardly from the main housing 1.

Having thus described the invention what I claim as new and desire to secure by Letters Patent is:

1. Apparatus for cleaning, grooming and otherwise treating dogs and other animals of similar size comprising, in combination, a rectangular main housing of sufficient volume to accommodate the animal;

said rectangular main housing including a pair of fixed, spaced parallel side walls and front and rear spaced parallel end panels;

said front panel being divided at approximately the horizontal center-line of the apparatus into lower and upper panel sections;

said end panels being retained at the vertical edges thereof in guide channels on said side panels and being temporarily removable;

a dome-shaped cover disposed atop said rectangular main housing;

said dome-shaped cover including a transparent portion;

a bottom member with a drain disposed in said main housing;

a horizontally extending vertically adjustable perforate platform carried by said main housing and disposed above the bottom member thereof;

a transversely extending adjustable supporting and restraining sling attached to said main housing above the perforate platform therein;

said transversely extending, adjustable supporting and restraining sling being adapted to make contact with the underside of the animal;

the upper horizontal edge of said lower front panel section and the lower horizontal edge of the upper front panel being provided with opposed and matching semi-circular recesses forming between them a circular aperture which permits the passage therethrough of the head of the animal;

an iris-shaped closure of flexible waterproof material being disposed in said circular aperture and expandable and contractible by means of a circular adjusting ring;

each of the side walls of said main housing having at least one aperture for receiving a hand and forearm of the operator of the apparatus; and means for supplying water to the interior of said main housing.

* * * * *